(No Model.)
H. C. BEHR.
NUT LOCK.
No. 247,237. Patented Sept. 20, 1881.
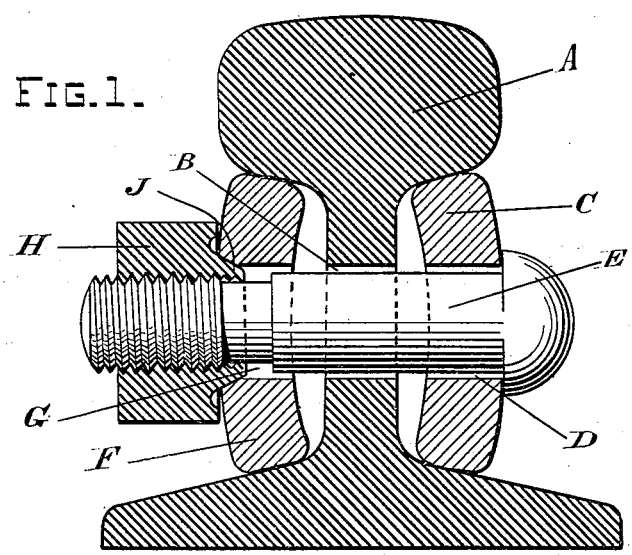
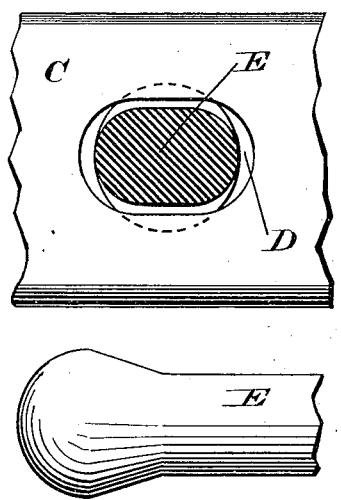
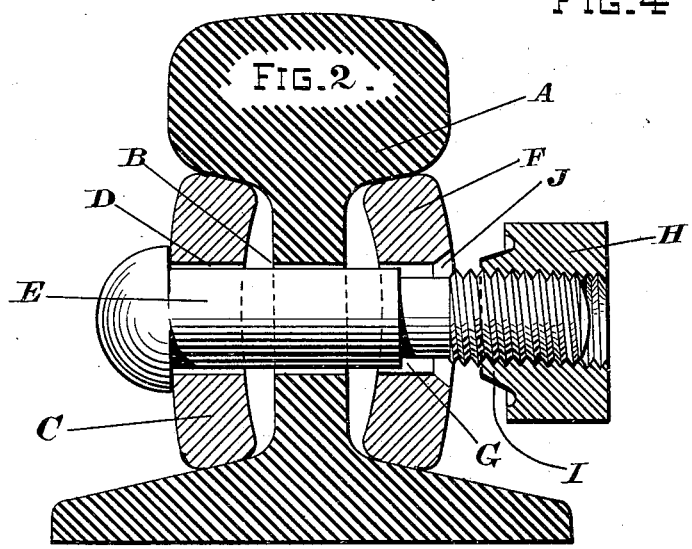
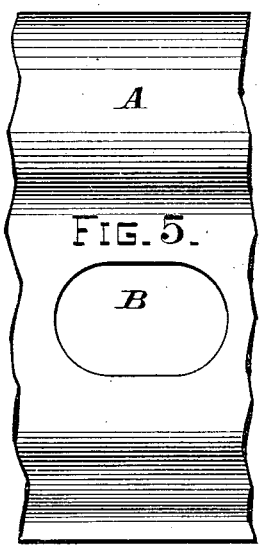
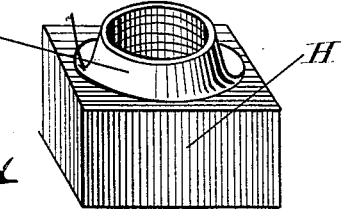
WITNESSES
Wilmer Bradford
Charles Pepp
INVENTOR
Hans C Behr
By C. W. M. Smith
Attorney
N. PETERS, Photo-Lithographer, Washington, D. C.

United States Patent Office.

HANS CHARLES BEHR, OF SAN FRANCISCO, CALIFORNIA.

NUT-LOCK.

SPECIFICATION forming part of Letters Patent No. 247,237, dated September 20, 1881.

Application filed June 9, 1881. (No model.)

*To all whom it may concern:*

Be it known that I, HANS CHARLES BEHR, a citizen of the United States, and residing at San Francisco, in the county of San Francisco and State of California, have invented a certain new and useful Lock-Nut, of which the following is a specification.

My invention relates to certain improvements in lock-nuts, and more particularly to that class of lock-nuts which are used upon the fish-plates of railways to bind or hold together the ends of the rails, but which may be used to great advantage upon harvesting-machines, vehicles, &c., and in all places where it is desirable to prevent the nut from becoming loose by the jarring or tremulous motion of the machinery. This object I accomplish by means of the mechanism illustrated in the accompanying drawings, in which—

Figure 1 is a cross-section through a rail and fish-plates, showing the position of the lock-nut when tightened up. Fig. 2 is a view of the same, showing the position of the parts before the nut is tightened up. Figs. 3, 4, and 5 are detail views. Fig. 6 is a perspective view of the nut.

Similar letters of reference are used to designate like parts throughout the several views.

A represents an ordinary railroad-rail, provided near the center of its web with the elongated aperture or slot B, and the object of having the slot or aperture B elongated in the direction of the length of the rail is that provision may be made for the expansion and contraction of the rail in the direction of its length and that the fish-bolt will not be subjected to a shearing strain.

The fish-plate C is provided with an aperture or slot, D, similar in form to the slot in the rail. The bolt E is constructed in the form shown, being somewhat elliptical in cross-section near the head, or so as to conform to the slot in the fish-plate C, which construction prevents the bolt from turning while the nut is being screwed up, and is provided at its outer end, or that portion which projects beyond the fish-plate F, with a screw-thread, and at the base of this thread the diameter of the bolt is contracted or made smaller than the circular opening G, through which it passes. The outer edge of the orifice G is beveled or countersunk, as is clearly shown at letter J in the drawings.

The nut H is threaded in the usual manner, and is provided upon that side which bears against the fish-plate with an annular tapering projection or bushing, I, the lesser diameter of which should be slightly greater than the diameter of the hole G in the fish-plate F. At the base of this hollow conical projection I there is a recess or round fillet cut or cast in the metal of the nut, by which means the length of the tapering projection or bushing is increased without increasing the total length of the nut.

The operation of my improved lock-nut will be as follows, to wit: The bolt having been placed in its proper position in the rail and fish-plates, the nut H is screwed home, and the tapering projection or bushing I upon the nut will come in contact with the beveled edges J of the orifice G, and the screwing operation being continued the said tapering projection will be compressed around the reduced portion of the bolt, and thus prevent all possibility of the nut leaving the bolt except by being unscrewed with a powerful wrench or spanner.

By this construction it will be seen that I provide a lock or jam nut which is exceedingly simple in its construction and efficient in its mode of operation, and may be constructed at a very low cost of manufacture, as it dispenses entirely with divided or bifurcated nuts and washers, keys, wings, pins, and ratchets.

Having thus described my invention, what I claim, and desire to secure by Letters Patent, is—

1. A lock-nut provided upon its bearing-surface with a tapering annular projection or bushing, adapted to be compressed around a reduced portion of the bolt, and having an annular recess or fillet at the base of said projection, substantially as and for the purpose specified.

2. The lock-nut H, provided with a tapering annular projection or bushing, I, and bolt E, having a portion of its length at the base of the screw-thread thereon contracted or reduced in diameter, in combination with the fish-plate F, provided with a circular aperture, G, the outer edges of which are beveled or countersunk, all when constructed, arranged, and operating substantially in the manner as herein shown and set forth.

In testimony that I claim the foregoing I have hereunto set my hand and seal this 28th day of May, 1881.

HANS CHARLES BEHR. [L. S.]

Witnesses:
WILMER BRADFORD,
CHAS. E. KELLY.